ns286B2

United States Patent
Shankar et al.

(10) Patent No.: US 10,255,286 B2
(45) Date of Patent: Apr. 9, 2019

(54) FILE METADATA HANDLER FOR STORAGE AND PARALLEL PROCESSING OF FILES IN A DISTRIBUTED FILE SYSTEM, AND ASSOCIATED SYSTEMS AND METHODS

(71) Applicant: Software AG, Darmstadt (DE)

(72) Inventors: Satish Shankar, Bangalore (IN); Sanju Krishnan Retnakumari, Bangalore (IN)

(73) Assignee: Software AG, Darmstadt (DE)

( * ) Notice: Subject to any disclaimer, the term of this patent is extended or adjusted under 35 U.S.C. 154(b) by 459 days.

(21) Appl. No.: 14/132,976

(22) Filed: Dec. 18, 2013

(65) Prior Publication Data

US 2015/0169602 A1 Jun. 18, 2015

(51) Int. Cl.
*G06F 17/30* (2006.01)
(52) U.S. Cl.
CPC .. *G06F 17/30091* (2013.01); *G06F 17/30194* (2013.01); *G06F 17/30923* (2013.01); *G06F 17/30997* (2013.01)
(58) Field of Classification Search
CPC ......... G06F 17/30067; G06F 17/30091; G06F 17/30194; G06F 17/30923; G06F 17/30997
USPC .......................................................... 707/825
See application file for complete search history.

(56) References Cited

U.S. PATENT DOCUMENTS

| | | | | |
|---|---|---|---|---|
| 2003/0185395 | A1* | 10/2003 | Lee | G06F 21/10 380/277 |
| 2005/0015377 | A1* | 1/2005 | Wan | G06F 17/30557 707/999.01 |
| 2013/0041872 | A1* | 2/2013 | Aizman | G06F 17/30194 707/690 |

OTHER PUBLICATIONS

BitDew: Open Source Data Management for Grid, Desktop Grid and Cloud Computing [online] [retrieved Dec. 18, 2013]. http://www.bitdew.net/.
The Apache Software Foundation—Need an FTP Server Implementation over HDFS [online] [retrieved Dec. 18, 2013]. https://issues.apache.org/jira/i#browse/HDFS-217.
The Apache Software Foundation—FTP Client over HDFS [online] [retrieved Dec. 18, 2013]. https://issues.apache.org/jira/i#browse/HADOOP-3246.
IPONWEB—HDFS over FTP [online] [retrieved Dec. 18, 2013]. https://sites.google.com/a/iponweb.net/hadoop/Home/hdfs-over-ftp.
Software AG—WebMethods Active Transfer Overview [online] [retrieved Dec. 18, 2013]. http://www.softwareag.com/corporate/products/wm/integration/products/file_transfer/overview/default.asp.
Software AG—WebMethods Active Transfer Capabilities [online] [retrieved Dec. 18, 2013]. http://www.softwareag.com/corporate/products/wm/integration/products/file_transfer/capabilities/default.asp.

(Continued)

*Primary Examiner* — Dinku W Gebresenbet
(74) *Attorney, Agent, or Firm* — Nixon & Vanderhye, P.C.

(57) ABSTRACT

Certain example embodiments described herein relate to a File Metadata Handler that helps an integrated managed file transfer solution perform processing in connection with complex distributed file systems, while still cooperating with more straightforward and/or conventional file systems, servers, and/or the like. The File Metadata Handler of certain example embodiments may be able to work with, or take the place of, a more conventional file handler adapter, e.g., to provide possibly required pre-processing and/or additional file processing at runtime for more complex file systems, transport protocols, and/or the like.

16 Claims, 9 Drawing Sheets

(56) References Cited

OTHER PUBLICATIONS

Software AG—WebMethods Active Transfer How it Works [online] [retrieved Dec. 18, 2013]. http://www.softwareag.com/corporate/products/wm/integration/products/file_transfer/how_it_works/default.asp.
Hadoop—Hadoop Shell Commands [online] [retrieved Dec. 18, 2013]. http://hadoop.apache.org/docs/r0.18.3/hdfs_shell.html.
Hadoop—The Hadoop Distributed File System: Architecture and Design [online] [retrieved Dec. 18, 2013]. http://hadoop.apache.org/docs/r0.18.3/hdfs_design.html.
Hadoop—FTP to HDFS [online] [retrieved Dec. 18, 2013]. http://hadoop101.blogspot.in/2011/12/ftp-to-hdfs.html#!/2011/12/ftp-to-hdfs.html.
GitHub—HDFS over FTP [online] [retrieved Dec. 18, 2013]. https://github.com/iponweb/hdfs-over-ftp.
Hadoop—FTP [online] [retrieved Dec. 18, 2013]. https://code.google.com/p/hadoop-ftp/source/browse/#svn%2Ftrunk%2FHDFS-Ftp.
Wikipedia—Clustered File System [online] [retrieved Dec. 18, 2013]. http://en.wikipedia.org/wiki/Clustered_file_system.

* cited by examiner

FILE METADATA HANDLER FOR STORAGE AND PARALLEL PROCESSING OF FILES IN A DISTRIBUTED FILE SYSTEM, AND ASSOCIATED SYSTEMS AND METHODS

TECHNICAL FIELD

Certain example embodiments described herein relate to an integrated managed file transfer solution. More particularly, certain example embodiments described herein relate to a File Metadata Handler that helps an integrated managed file transfer solution perform processing in connection with complex distributed file systems, while still cooperating with more straightforward and/or conventional file systems, servers, and/or the like.

BACKGROUND AND SUMMARY OF EXAMPLE EMBODIMENTS OF THE INVENTION

Distributed File Systems are known in the computer-related arts and typically support conventional hierarchical file organizations. For instance, a user or an application can create directories and store files inside the created directories. Distributed File Systems oftentimes are set up to have master/slave architectures and oftentimes can provide high data bandwidth and scalability by using many nodes in a single cluster where every single instance can support many files. For instance, hundreds of nodes may be provided, and each cluster may support millions of files.

A Distributed File System additionally or alternatively may be tuned to support large files, e.g., that sometimes may be gigabytes or more in size. Very large files may be reliably stored across machines in a large cluster, for instance. Internal to the Distributed File System, a file may be split into one or more blocks, and these blocks may be stored in multiple nodes in the cluster.

Replicated data may be stored in multiple nodes in some implementations, and this design can in some cases help in reliability and/or performance of the overall Distributed File System.

Distributed File Systems oftentimes are designed to favor batch processing over interactive use by users, e.g., placing the emphasis on high throughput for data accessions, etc., rather than low latency for data accessions. To facilitate the processing of many files and/or large files, Distributed File Systems oftentimes are designed to handle network failures, failures of nodes in a cluster, and/or the like.

The webMethods ActiveTransfer, commercially available from the assignee, is an integrated managed file transfer solution that in essence provides a single point of control for all file transfer activities, both inside and outside an extended enterprise. ActiveTransfer enables organizations to exchange information securely over a computer-mediated network such as the Internet and supports a variety of communication protocols, including HTTP, HTTPS, FTP, FTPS (SSL), SFTP (SSH), SCP, WebDAV, and WebDAVs protocols. It also supports a variety of file system architectures such as, for example, FAT32, NTFS, etc. ActiveTransfer thus enables users to interact with a variety of different business partners, while offering data security solutions including support for the world's most stringent encryption standards (such as, for example, SSL and integrated PGP). For instance, a user can apply global and/or per-user IP address restrictions, apply policies that restrict file transfer activities during specific days of the week and/or time of day, etc. ActiveTransfer thus can help in bringing together B2B, application support, managed file transfer, and/or other activities, for example, in a service-oriented platform.

Although ActiveTransfer is useful in many scenarios, the inventors have recognized that the current ActiveTransfer implementation could be improved in certain ways. For example, the architecture underlying ActiveTransfer stores files in a File System, which can limit the size and/or amount of data being processed. Although the File System could be implemented over a cluster of nodes, a large degree of homogeneity likely would be needed, e.g., as all nodes in the cluster would have to use the shared file system (e.g., using mapped network drives).

End users also may in some instances have to implement custom logic for processing files, thereby potentially requiring a high degree of skill, time, and in-depth knowledge about the files being processed, the systems being used, etc. And because files typically will not be broken into pieces, individual clients oftentimes will have to process large files sequentially, thereby creating the potential for networking bottlenecks. In a similar vein, end users themselves may have to manage the space in the File System, make backups for possible recovery purposes, etc.

The inventors have, however, recognized that Active-Transfer can be integrated with certain Distributed File System (DFS) techniques, e.g., to help address these and/or other issues. For instance, integrating ActiveTransfer with a DFS architecture could be useful in allowing end users to upload files using ActiveTransfer and have these files processed in batches. It will be appreciated that the write-once-read-many access model for files would be useful in this example scenario.

Certain example embodiments thus relate to the integration of an integrated managed file transfer solution (e.g., ActiveTransfer and/or the like) with a Distributed File System (e.g., HDFS, Amazon S3, and/or the like), optionally with a map reduce framework (e.g., Hadoop and/or the like). Among other things, map reduce frameworks provide programming models for processing large data sets with a parallel, distributed algorithm on a cluster. The presence of the DFS (optionally with a map reduce framework) advantageously can aid in: the processing of vast amounts of data in-parallel on large clusters in a reliable and fault-tolerant manner, the storage of very large amounts of data (e.g., terabytes, petabytes, etc.), the high-throughput accessing of such information, and/or the like. Files and/or portions of files may in some instances be stored in a redundant fashion, e.g., across multiple machines, to help deal with potential network and/or node failures, high availability (e.g., as a general matter and potentially to parallel applications), etc.

ActiveTransfer itself may be thought of as a virtualization layer for the (possibly secure) transfer of files. The implementation of ActiveTransfer as a Virtual File System (VFS) may involve "adapters" to aid in file input/output (I/O) processing during runtime. That is, in order to handle "virtual files," a decoupling layer may be defined separate from the physical implementation, and an adapter that can take care of the particular application programming interface (API) calls may be provided.

Yet when an integrated managed file transfer solution such as ActiveTransfer is integrated with a more complex distributed file system, further processing of the metadata of a file may be needed. For example, when working with a more complex framework for distributed processing of large data sets across clusters of computers using simple programming models and/or a more distributed, scalable, and portable file system, it may not be sufficient to adapt a particular API at execution time, e.g., by providing a runtime adapter.

Although it is possible to pre-configure or hard-code constants as configuration data, etc., the application of fixed values reduces flexibility of the file system being implemented and can detract from some of the benefits provided by the more complex file system.

The inventors thus have recognized that the use of a File Metadata Handler or the like may in certain example embodiments facilitate the storing of files in the DFS and/or the processing of such files, e.g., in a more dynamic manner. The File Metadata Handler of certain example embodiments may be able to work with, or take the place of, a more conventional file handler adapter, e.g., to provide possibly required pre-processing and/or additional file processing at runtime.

For example, in a DFS, files may be split across nodes physically based on size. However, files sometimes may additionally or alternatively be split logically. Logical splitting may, however, require information about how the data in the file is stored. A File Metadata Handler according to certain example embodiments may help in maintaining this information, e.g., so that it can be provided to the map reduce framework, etc.

As another example, for the processing of Map-Reduce Tasks, knowledge of how the data in a given file is stored. For instance, Map-Reduce Tasks may need to know whether there are multiple columns in a row, e.g., to decide which column(s) should be processed and which column(s) can be ignored. Similarly, if there is any validation, data transformation, etc., to be performed, the map reduce framework may need to be provided with such information. A File Metadata Handler according to certain example embodiments may help in maintaining this information, as well.

As still another example, certain file formats can require custom definitions as to how logical file splits in a Distributed File System are to take place. For instance, a custom definition may need to be provided for EDI-type data, e.g., such that data for each block in an EDI file can be processed by a Map-Reduce Task in a sequential manner. A File Metadata Handler according to certain example embodiments could help in defining transaction boundaries in and/or across files.

One aspect of certain example embodiments relates to storing files in a Distributed File System where an integrated managed file transfer solution (such as ActiveTransfer) acts as an interface, and enabling an end user to define metadata linked with the files being processed via the integrated managed file transfer solution.

Another aspect of certain example embodiments relates to a File Metadata Handler that helps provide file metadata required for processing files such as, for example, the customized and/or automatic logical splitting of files in a Distributed File System.

Another aspect of certain example embodiments relates to a File Metadata Handler that helps provide file metadata required for Map-Reduce Tasks so that processing of data (e.g., validation, transformation, skipping of columns in a row, etc.) can be customized at runtime.

In certain example embodiments, there is provided a method for enabling the accessing and/or processing of data stored in one or more computer systems in connection with a file metadata handler that has built-in support for a plurality of different file formats. A request to create a file metadata definition for the file metadata handler is received, with the file metadata definition being configurable for a first file format, and with the first file format being a file format for which the file metadata handler at least initially does not have built in support. Files in the first file format have associated metadata that needs to be processed in order to process such files and/or files in the first file format have associated metadata for which processing logic is required to be defined in order to process such files. The received file metadata definition is linked with an identifier that identifies files of the first file format. Format information that includes information about elements that are available to files having the first file format is received. The file metadata definition is updated with received transaction boundary information, data validation information, information concerning data transformations to be applied to the elements, and/or linkages between encrypted protocols and decryption tools, if any, for the first file format. The updated file metadata definition is stored in a non-transitory computer readable storage medium, in enabling the file metadata handler to access and/or process data in the first file format.

According to certain example embodiments, the File Metadata Handler may help an end user to define or specify information such as, for example, file envelope format (e.g., headers, body, and payload if any), file format (XML, Text, JSON, CSV, etc.), elements that define transaction boundaries, validation of the data, conditions and/or logic for data transformation and processing, support for processing of encrypted data, etc. This may help in some cases provide a link for the files in the first file format that have associated metadata that needs to be processed in order to process such files and/or for which processing logic is required to be defined in order to process such files.

In certain example embodiments, a method of processing files in connection with a server is provided. A listing of objects is provided to a client computing device from a plurality of different computer systems that have different respective file systems and/or are accessible via different respective transport protocols, with the listing organizing the objects in a common, integrated view of virtual folders. A request to process an object that is stored remote from the client computer device is received from the client computing device. A determination is made as to whether the server has built-in support for processing the object, based on the file system to be accessed, and the transport protocol to be used, in processing the request to process the object. In response to a determination that the server has built-in support for processing the object, the request to process the object is processed using the built-in support of the server. In response to a determination that the server does not have built-in support for processing the object: a file format for the object is determined based on how the object is named; a file metadata definition for the determined file format is accessed from a data store, with the file metadata definition including format information about elements that are available in the determined file format, as well as (a) transaction boundary information, (b) data validation information, (c) information concerning data transformations to be applied to the elements, and/or (d) linkages between encrypted protocols and decryption tools; and the request to process the object using the accessed file metadata definition is processed. The server does not have built-in support for processing objects stored on one or more distributed file systems, and the data store includes file metadata definitions for each said distributed file system.

In certain example embodiments, there are provided non-transitory computer readable storage mediums tangibly storing instructions that, when executed by at least one processor of a computer system, perform the above-described and/or other methods.

Similarly, in certain example embodiments, a computer system including a processor, a memory, and a non-transitory computer readable medium, is configured to execute computer functions for accomplishing the above-described and/or other methods. For instance, in certain example embodiments, a data processing system is provided. A managed file transfer solution server includes at least one processor and a memory, with the managed file transfer solution being configured to provide a single virtual folder based view of data stored on a plurality of different computer systems and receive requests to process data in connection with the plurality of different computer systems. The different computer systems support at least FTP and HTTP protocols, as well as at least one distributed file system. A file metadata handler is configured to store user-configurable definitions, with the definitions providing metadata information needed to access at least some of the computer systems and/or the data stored therein. At least one user-configurable definition is provided for the at least one distributed file system, and the at least one user-configurable definition provided for the at least one distributed file system includes metadata needed to access data stored on the at least one distributed file system. At least some of the definitions stored by the file metadata handler are accessible in dependence on a naming convention associated with data being requested.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
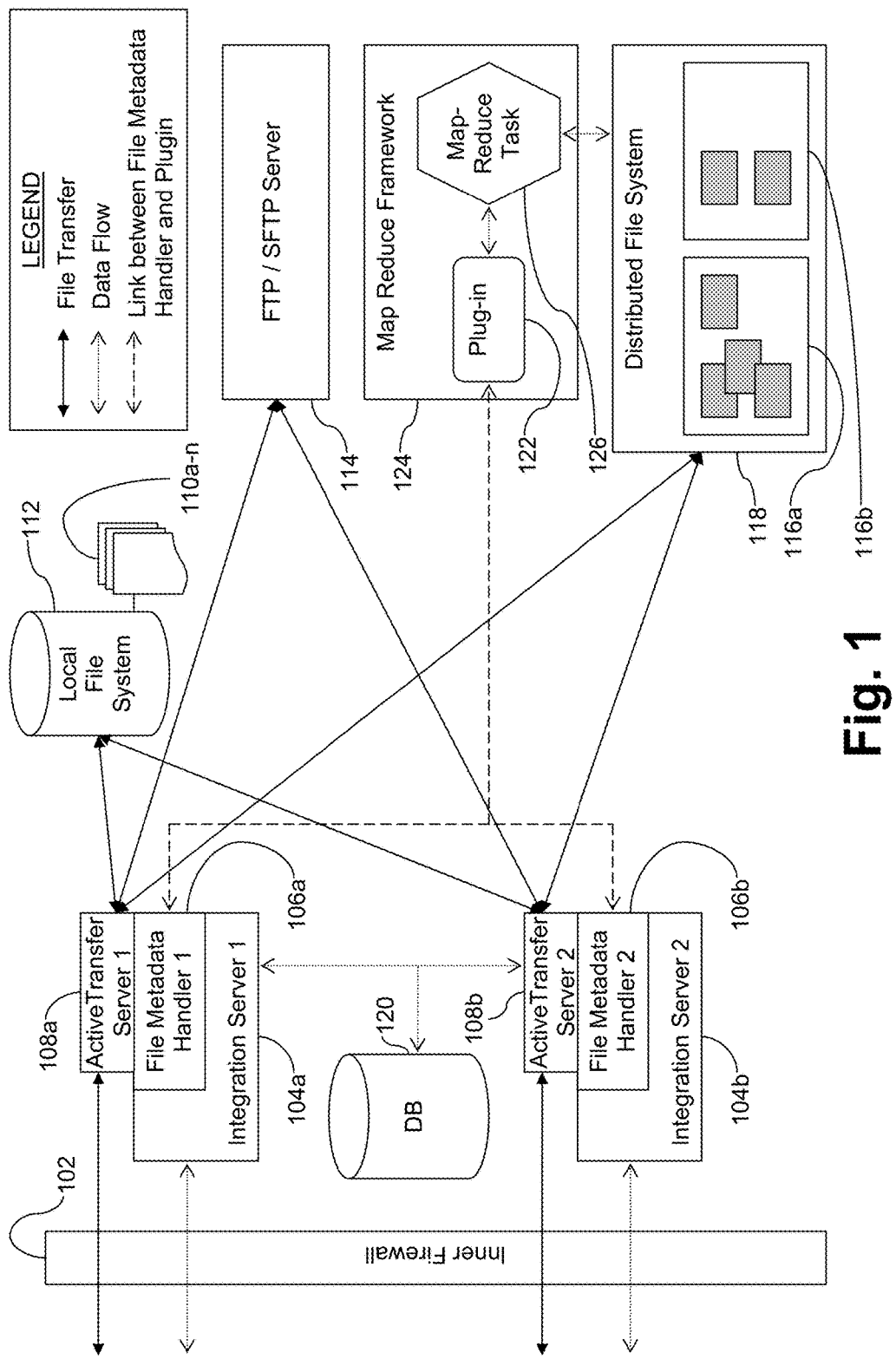
FIG. 1 is a block diagram illustrating how an integrated managed file transfer solution may be integrated with a Distributed File System (DFS) and a map reduce framework, while making use of a File Metadata Hander, in certain example embodiments.

Certain example embodiments relate to the integration of an integrated managed file transfer solution (e.g., Active-Transfer and/or the like) with a Distributed File System (e.g., HDFS, Amazon S3, maprfs, and/or the like) with an optional map reduce framework (e.g., Hadoop and/or the like). Certain example embodiments may incorporate a File Metadata Handler that aids in performing required pre-processing and/or additional file processing, e.g., at runtime, in order to enable the managed file transfer solution to perform manipulations on data stored in the Distributed File System (DFS). The File Metadata Handler of certain example embodiments may be implemented as an add-on package to an Integration Server that helps an end user define some or all of the following and/or other information related to file metadata:
    File envelope format (e.g., header, body, and payload (if any), etc.);
    File type (e.g., XML, flat text, JSON, CSV, etc.);
    Elements that define transaction boundaries;
    Validation of the data (e.g., CRC; hashing, etc.);
    Conditions and logic for data transformation and processing; and/or
    Support for processing of encrypted data.

In certain example embodiments, the File Metadata Handler may act as a repository and provide information about the metadata/schema of the file at runtime to a requesting component (such as, for example, a Hadoop Job, a Map-Reduce Task, etc.). The File Metadata Handler in certain example embodiments may store predefined metadata information for standard file formats, while also supporting an architecture in which an end user can extend the support for a new file format.

The defined metadata may be associated with a filename pattern or the like. For instance, the pattern in the filename could involve the definition of a suffix and/or prefix in the filename that uniquely defines the structure of the file. Alternatively, or in addition, this information may be retrieved from the file if a unique identifier or the like is appended or pre-pended to the file, e.g., via the integrated managed file transfer solution. In other cases, the information may be inferred from context such as, for example, the user performing the upload, the organization or entity from which the file is being uploaded, the path from which the file is being uploaded, etc. Files uploaded to the distributed file system via the integrated managed file transfer solution may be linked with the appropriate file metadata in the File Metadata Handler of certain example embodiments in this way.

A user interface (e.g., a web-based user interface) may be provided to help a user provide configuration details. For instance, the user interface may be used to help an end user define the file envelope for supported file formats, specify data elements that indicate the start and end of transactions, specify data that requires validations and/or transformations together with the type(s) of the validation(s)/transformation(s), link the data stored in a specific row or column (e.g., based on a file header) with a key or digital certificate, etc. This and/or other configuration information may be stored in a database accessible to the File Metadata Hander.

FIG. 1 is a block diagram illustrating how an integrated managed file transfer solution may be integrated with a DFS and a map reduce framework, while making use of a File Metadata Hander, in certain example embodiments. The example components are shown as being behind an inner firewall 102, e.g., separate from end users and their associated computing devices. First and second integration servers 104*a*-104*b* are provided with first and second File Metadata Handlers 106*a*-106*b* and have associated managed file transfer servers 108*a*-108*b* (which, in this example, are labelled ActiveTransfer servers). Data may flow from client devices outside of the firewall to the integration servers 104*a*-104*b*, and vice versa, e.g., in responding to requests for object manipulations (e.g., such as file uploads/downloads, copying, moving, renaming, directory creating, generating file and/or directory listings, etc.), and/or the like. The client devices may be able to access managed file transfer clients, e.g., through a web or other network interface, e.g., in order to be provided with a coherent (e.g., hierarchical) view of the files stored in the FIG. 1 system, without necessarily knowing where the files, folders, and/or other structures reside in the system. In other words, the clients, through the managed file transfer servers 108*a*-108*b* may have coherent view of files 110*a*-*n* provided to the local file system 112, an FTP or SFTP server 114, blocks of the nodes 116*a*-116*b* of the DFS 118, etc., and the managed file transfer servers 108*a*-108*b* may provide vehicles for the client devices to transfer data to/from these locations, and/or otherwise process objects thereon. As described above, this may be facilitated using the database 120 that stores configuration data enabling these complex file systems and/or their associated protocols to be used. As also indicated above, a link is provided between the File Metadata Handlers 106*a*-106*b* and a plug-in 122 provided to the map reduce framework 124 that enables a Map-Reduce Task 126 to be performed in connection with the DFS 118. Further detail concerning this example plug-in 122 is provided below.

The managed file transfer solution of certain example embodiments may include a "Virtual Folder System" (VFS) that represents data to be displayed to the user. A user can connect to ActiveTransfer Server, for example, using different protocols (such as, for example, FTP, FTPS, SFTP, etc.) and, once the user logs-in to the system, the data can be viewed and operated on by the user (e.g., for upload, download, copy, move, and/or other operations). A Virtual Folder can be mapped to different types of data sources, e.g., depending on the protocol used and/or server being connected to. For instance, a Virtual Folder can be a File System, a remote FTP Server, a remote SFTP Server, etc. The VFSs of certain example embodiments are advantageous, as the user may be able to simply view the data as files and folders while also being insulated from the complexity of underlying data source.

The Virtual Folders may have a layer of managed features on top of them, e.g., to help enable the administrator to specify properties, access restrictions, etc., for users and/or for Virtual Folders. For example, administrators may specify that a particular user or user class may view only the Virtual Folders assigned to that specific user and/or specific user class.

In certain example embodiments, a Virtual Folder may be mapped to a Distributed File System, as well. Once a Virtual Folder that is mapped to Distributed File System is created, users can be assigned to the Virtual Folder, as described above. In other words, in certain example embodiments, when a user logs in, that user can view the files and folders in the Distributed File System, similar to other files and folders in Local File System, an FTP server, etc. Similarly, a user can upload, download, or otherwise manipulate files and/or folders, e.g., using commands native to the protocol that the user uses to connect to the managed file transfer solution. For instance, if a user logs in to the managed file transfer solution of certain example embodiments using an FTP protocol, the user may use FTP commands to cause certain actions to be taken, even though the system being connected to and manipulated is a DFS.

Figure 2:
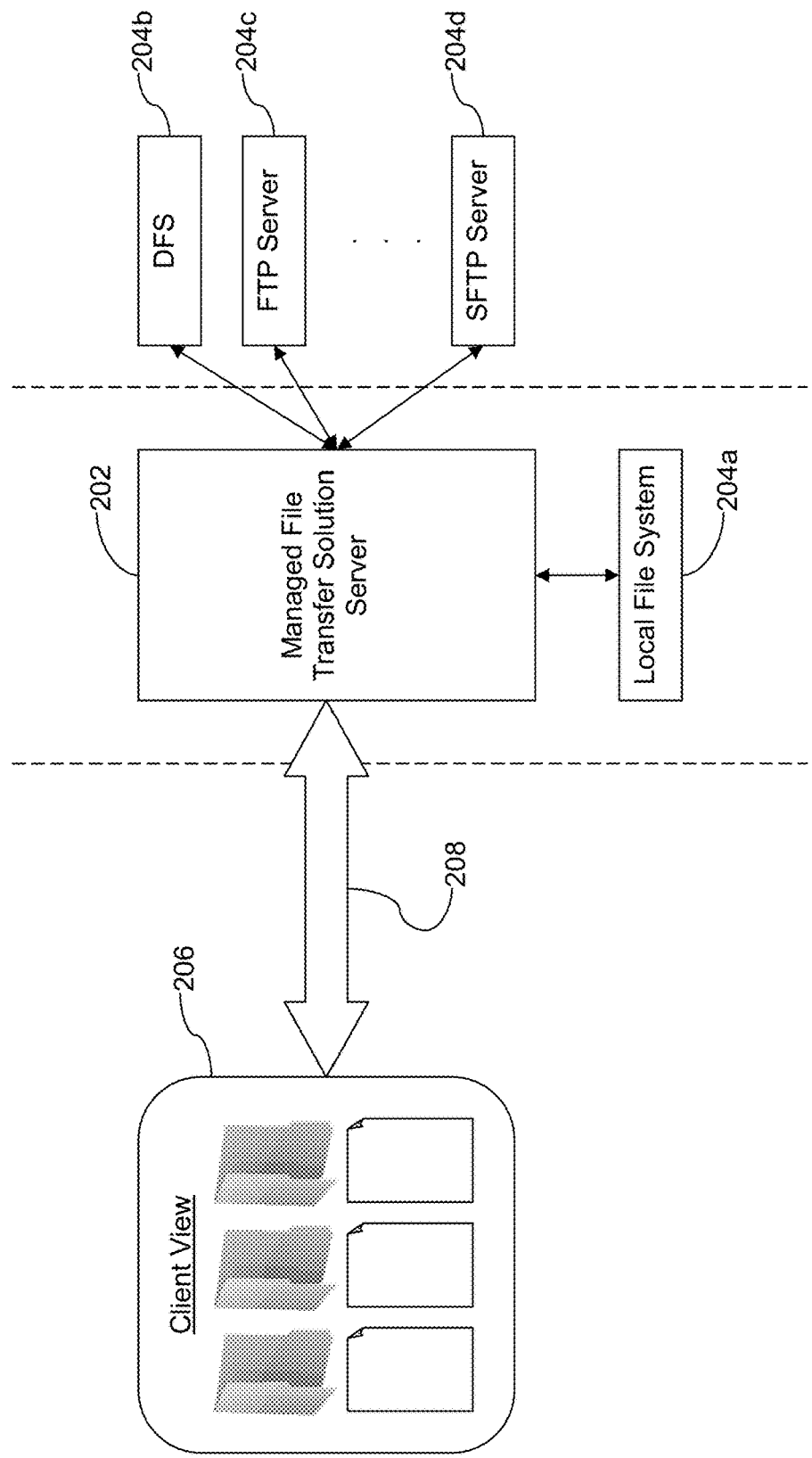
FIG. 2 is a block diagram that shows a user having a single, coherent client view of data from a plurality of different sources, and being able to manipulate data residing on those different sources through that coherent client view, in accordance with certain example embodiments.

FIG. 2 is a block diagram that shows a user having a single, coherent client view of data from a plurality of different sources, and being able to manipulate data residing on those different sources through that coherent client view, in accordance with certain example embodiments and, thus, helps demonstrate the concepts described in the preceding three paragraphs. As will be appreciated from FIG. 2, the managed file transfer solution server 202 can access the local File System 204*a*, the DFS 204*b*, a remote FTP Server 204*c*, a remote SFTP server 204*d*, etc., as underlying data sources. However, the user will be presented with the client view 206 (provided via a suitable interface on a computer, mobile device, or the like), which shows all of the data as "normal" files and folders, as the data source complexity is hidden from the user. As indicated above, client-to-server communication 208 may be mediated over any appropriate protocol (e.g., FTP, FTPS, SFTP, HTTP, HTTPS, WebDav, etc.) through which the user logs into the managed file transfer solution server 202. In certain example embodiments, the client view 206 of the data may be tailored to the login protocol used and/or commands to be given and/or received.

A plug-in may be provided in certain example embodiments, e.g., in the form of an add-on library for the map reduce framework. The plug-in may interact with File Metadata Handler(s) on the Integration Server(s) and may be able to fetch needed file metadata "on-demand." To help improve the overall efficiency of the network communication, the plug-in may in certain example embodiments be able to cache file metadata after retrieving it from File Metadata Handler(s). For instance, in certain example implementations, a Metadata Cache Manager may be provided for (e.g., in) the plug-in and may in some implementations store the metadata using filename patterns as keys. The Metadata Cache Manager may interact with Map-Reduce Tasks in some implementations.

Figure 3:
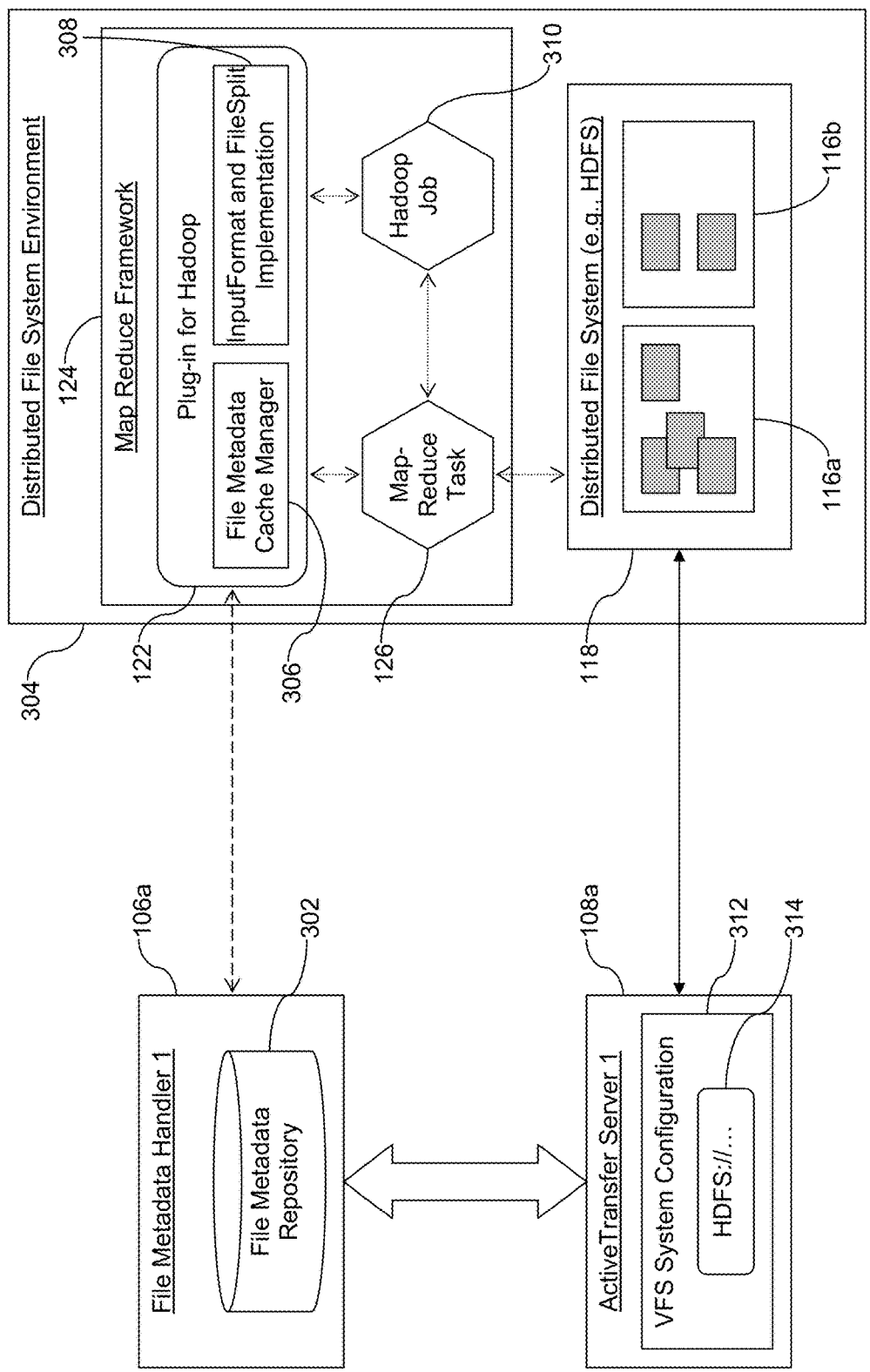
FIG. 3 demonstrates example components of a Map Reduce plug-in in accordance with certain example embodiments.

FIG. 3 is a more detailed version of a portion of FIG. 1 and demonstrates example components of a Map Reduce plug-in in accordance with certain example embodiments. As shown in FIG. 3, the first file metadata handler 106*a* includes an optional local cache of file metadata in a file metadata repository 302, which facilitates the connection between the first file metadata handler 106*a* and the plug-in 122 for the DFS environment 304. This file metadata repository 302 may store at least some of the information from the database 120. In the FIG. 3 example, the DFS environment 304 is Hadoop. Hadoop refers generally to the Apache Hadoop software library framework that allows for the distributed processing of large data sets across clusters of computers using simple programming models and makes use of the Hadoop Distributed File System (HDFS). HDFS is a distributed, scalable and portable file system written in Java for the Hadoop framework.

The plug-in 122 includes a File Metadata Cache Manager 306, and interface, class, function, and/or other processing implementations 308 that may be used with the Map-Reduce Job 310. In the FIG. 3 example, the interfaces and classes of interest to Hadoop include the InputFormat interface and the FileSplit class and, as a result, corresponding implementations are provided in the plug-in 122. In this context, InputFormat describes the input-specification for a Map-Reduce Job, and the FileSplit class constructs a split with host information, both for Hadoop. The plug-in provides data to the Map-Reduce Task 126, as well as the Hadoop Job 310, e.g., for performing functions associated with processing files in the HDFS 118. The HDFS 118 is in communication with the first ActiveTransfer Server 108*a*, e.g., as aided by the VFS system configuration data 312 stored therein (which may include, for example, a path 314 to the HDFS 118).

EXAMPLE IMPLEMENTATION

Figure 4:
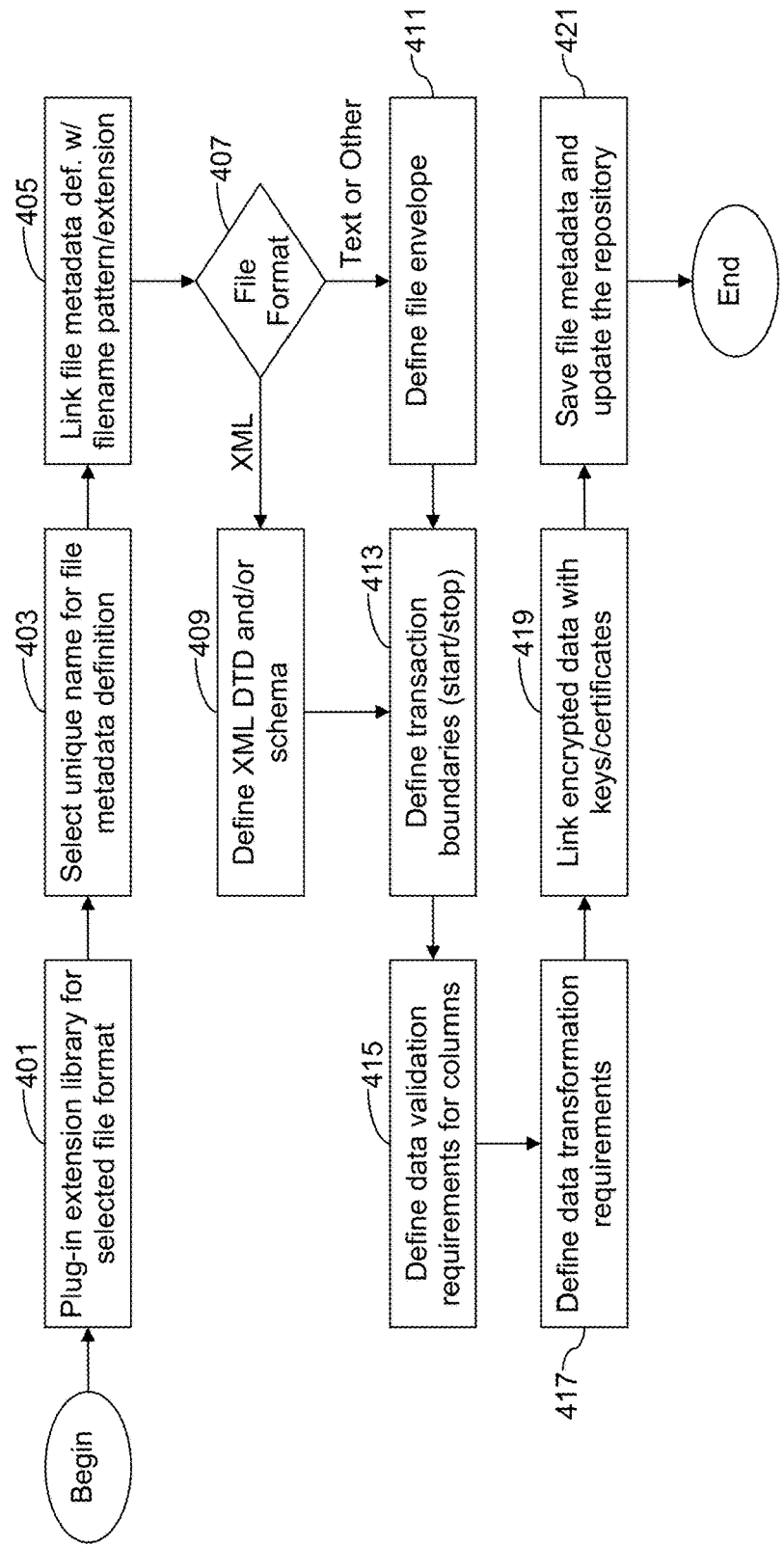
FIG. 4 is a flowchart showing a process that may be followed by a File Metadata Handler according to certain example embodiments.

An example implementation will now be provided. The example uses ActiveTransfer Server as the managed file transfer solution, and Hadoop as the DFS framework. It also assumes the presence of a map reduce framework, e.g., for facilitating distributed processing, etc. However, it will be appreciated that the techniques set forth herein may be used with any suitable combination or sub-combination of one or more managed file transfer solutions, DFSs, etc., with or without associated map reduce frameworks.
Example File Metadata Handler FIG. 4 is a flowchart showing a process that may be followed by a File Metadata Handler according to certain example embodiments. In step 401, an end-user will select an extension library. The File Metadata Handler will have built-in support for many formats. However, the plugging-in of an extension library may be provided for those formats for which support is not already available. In step 403, the user will select a unique name for the file metadata definition. In step 405, the user will link the file metadata definition with a filename pattern, an extension in the filename, or some other identifier. For example, the filename extension could be .xml, .csv, .EDI, etc., which would indicate corresponding type of XML files, comma-separated value files, EDI files, etc. As another example, the pattern in the filename could be a suffix and/or prefix in the filename that uniquely defines the structure of the file. This second option may be helpful when, for instance, it is desirable to provide the same filename extension to more than one filename pattern, but where the internal filename structure could vary. For example, there may two XML files having the same .xml extension, but different document type definitions (DTDs), schemas, or the like.

In step 407, the end-user will select the file format. For the purposes of this example, the file format selected could be an XML file, a text file, some other custom file format, although different options may be used in different embodiments. If the file type is XML, then the user will define the XML DTD and/or schema in step 409. If the file type is text or some other format, then the user may define the file envelope (including, headers, body and payload if any, etc.) in step 411.

In step 413, the user can define the transaction boundaries. For instance, the user may specify the start and end elements for transaction boundaries. The transaction boundary thus may include the information that has to be processed together (and sometimes in a sequential order) in order to ensure data integrity.

In step 415, the user can define data validation requirements for various columns (e.g., for text and/or other formats, as appropriate). It is noted that this information may already be specified in a DTD and/or schema, e.g., for XML formats or the like, and such validation information may be retrieved automatically. In certain example embodiments, a user may specify additional validations to be performed on top of such already-specified validation information. In certain example embodiments, the selected column names for text and/or other formats may be based on the header definition.

In step 417, the user can define data transformation requirements and link them with XML elements (e.g., for XML format) and/or column names (e.g., for text and/or other formats). This may include conditions, logic, etc. Example transformation requirements may include, for instance, a scenario in which a multi-national bank has data for transactions in multiple currencies for a time span, where currency conversion ratios vary on a day-to-day basis, and where analysis requires the transaction amounts to be converted into a single currency. Another example may involve data being collected from multiple universities in different countries concerning students' grades, where it would be desirable to normalize the data by defining logic to convert grades to a uniform scale (e.g., between a four-point scale of the type employed in the U.S. and a 10 point system, for example). Similarly, in step 419, the user can link keys, certificates, and/or the like, with the file metadata definition. The user can select XML elements and/or column names that are required to be processed using linked keys/certificates, etc. As above, some of this information may be determined automatically, at least in the case of some XML files where DTDs and/or schemas are known. In step 421, the end-user saves the File Metadata Definition, and the repository is updated.

Figure 5:
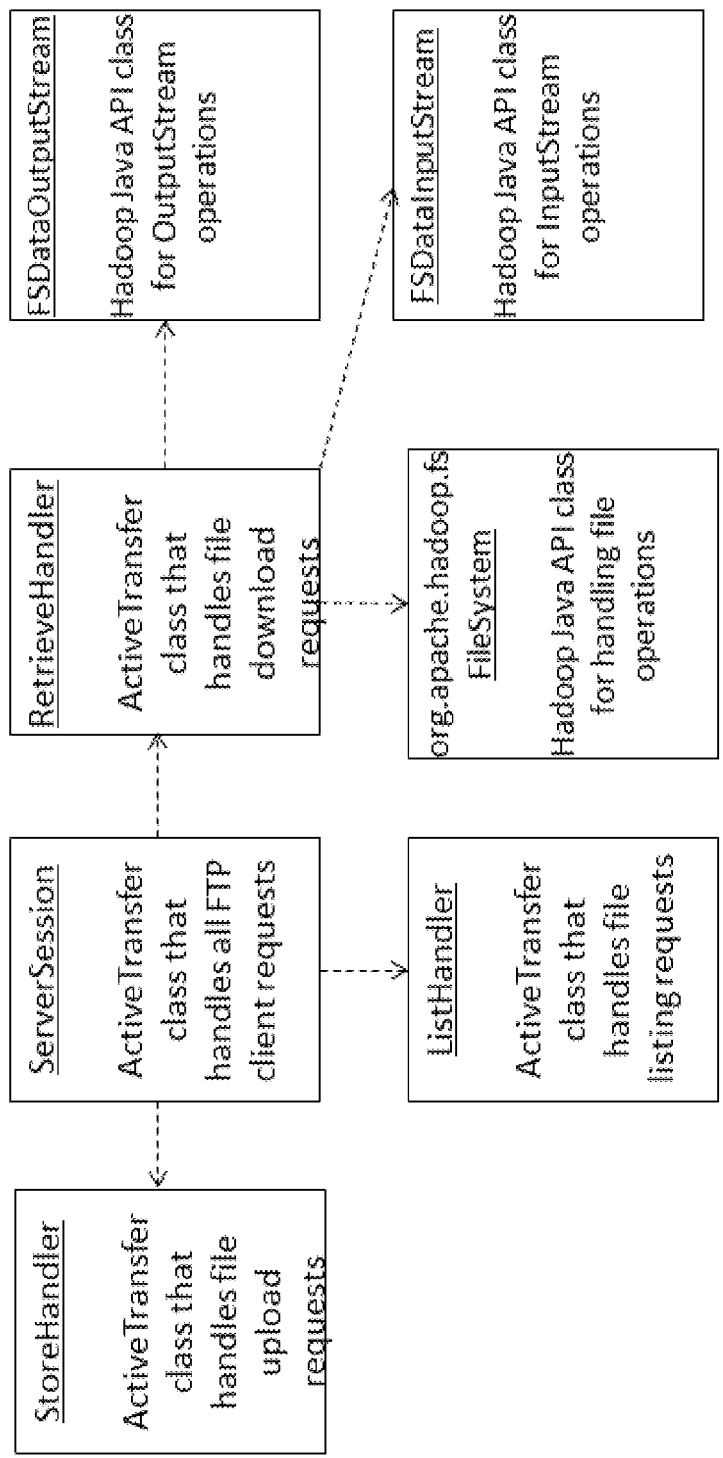
FIG. 5 shows how ActiveTransfer and Hadoop Java API classes may interact, e.g., to provide certain example functionality, in accordance with certain example embodiments.

Although the discussion above focused on columns (e.g., for data validation, keys and certificates, etc.), like functionality may be performed with respect to columns and/or rows. It also will be appreciated that validation, security, and/or other information may be derived for at least some known formats and/or formats where such information can be inferred (possibly automatically) from a DTD- or schema-like document.
Example Techniques for Integration of ActiveTransfer with HDFS As will be appreciated from the more general discussion above, a user can use certain example embodiments to navigate to a folder that is defined in a VFS that maps to an HDFS. In such a case, ActiveTransfer identifies that this is an HDFS folder and uses the HDFS application programming interface (API) to perform requested file and/or operations. HDFS provides a Java API to perform file operations such as, for example, listing, opening files, etc. ActiveTransfer may make use of the Java API for the HDFS VFS. Operations such as the listing of files, creation of files, checking of file attributes, etc., may be performed by the FileSystem class in the package org.apache.hadoop.fs. File read and write operations may be implemented using the FSDataOutputStream and FSDataInputStream Hadoop Java API. FIG. 5 shows how example ActiveTransfer and Hadoop Java API classes may interact, e.g., to provide this and/or other illustrative functionality, in accordance with certain example embodiments. Of course, it will be appreciated that different example embodiments that implement different managed file transfer solutions and/or different DFSs may have different linkages as between the same and/or different classes, etc., than those shown in the FIG. 5 example.

Figure 6:
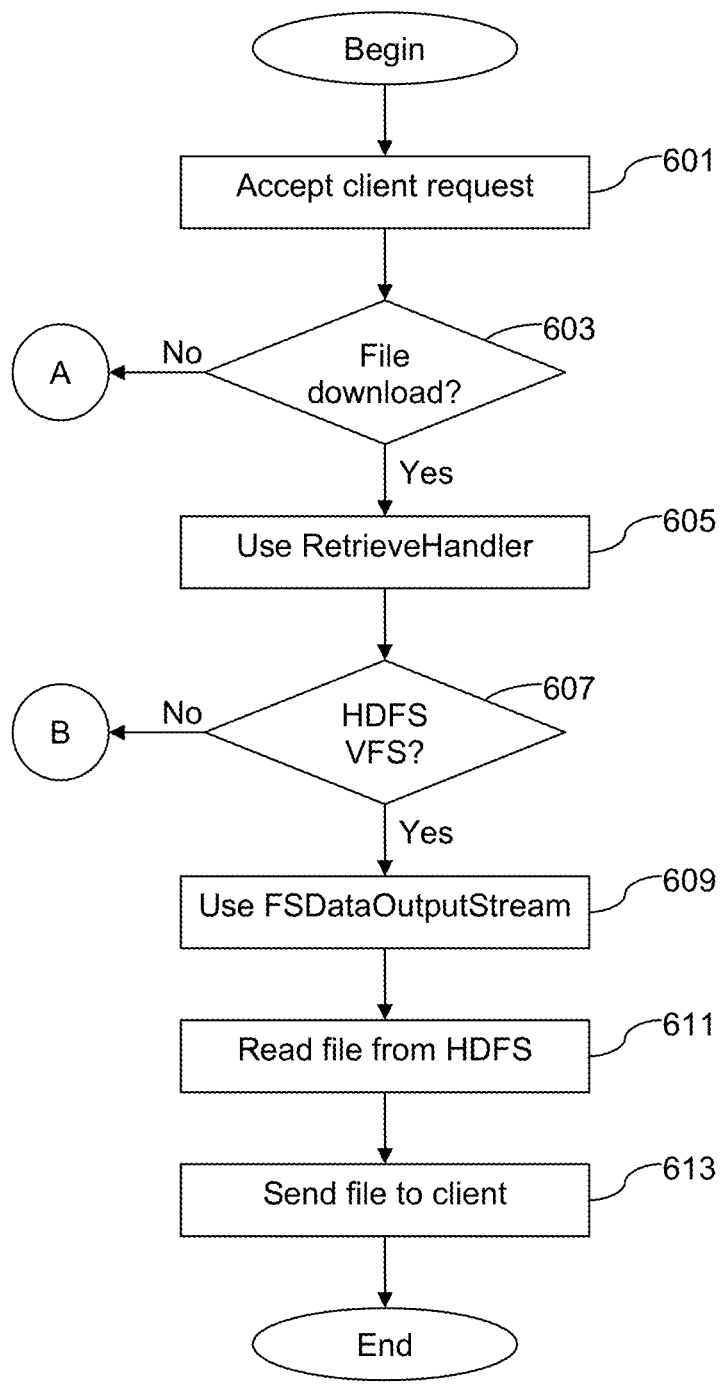
FIG. 6 is a flowchart showing an example process for handling a file download request from ActiveTransfer where the file to be downloaded is located in the HDFS in accordance with certain example embodiments.

FIG. 6 is a flowchart showing an example process for handling a file download request from ActiveTransfer where the file to be downloaded is located in the HDFS in accordance with certain example embodiments. In step 601, the ActiveTransfer server accepts a client request for an operation on a file, folder, etc. The decision in step 603 checks whether the request is for downloading a file. If the result is "No" (which indicates that the client request is not a download request), the flow continues to Connector A to process the request for a different operation. If the result is "Yes" (which indicates that the client request is a download request), the ActiveTransfer server uses the class Retrieve-Handler to download the file in step 605. In the decision in step 607, RetrieveHandler checks whether the VFS from which the file is requested is mapped to an HDFS. If the result is "No" (which indicates that the VFS from which the file is requested is not mapped to an HDFS), the flow continues to connector B for execution of the process for non-HDFS file systems. This may, for example, involve a request from a local file system, an FTP site, and/or the like. On the other hand, if the result from the decision in step 607 is "Yes" (which indicates that the VFS from which the file is requested is in fact mapped to an HDFS), RetrieveHandler uses the HDFS Java API to retrieve the file from the HDFS. This is shown in step 609. As will be appreciated from FIG. 6, the class FSDataOutputStream can be used to read the file from the HDFS. In step 611, the file is read from HDFS, and the file is sent to client in step 613. The process then ends.

Figure 7:
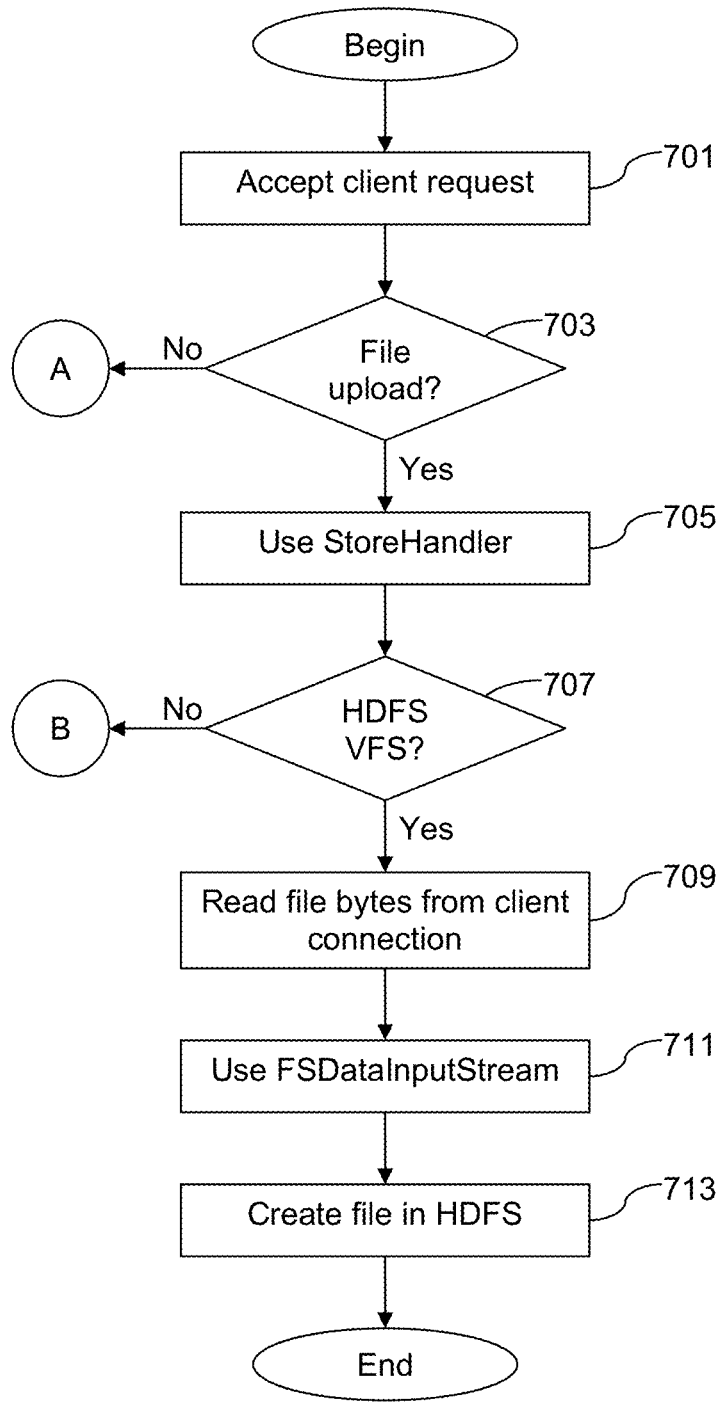
FIG. 7 is a flowchart showing an example process for handling a file upload request from ActiveTransfer where the file is to be uploaded to the HDFS in accordance with certain example embodiments.

FIG. 7 is a flowchart showing an example process for handling a file upload request from ActiveTransfer where the file is to be uploaded to the HDFS in accordance with certain example embodiments. In step 701, the ActiveTransfer server accepts a client request. The decision in step 703 checks whether the request is for uploading a file. If the result is "No" (which indicates that the client request is not an upload request), the flow continues to Connector A to process the request for a different operation. If the result is "Yes" (which indicates that the client request is an upload request), the ActiveTransfer server uses the class StoreHandler to process the upload file request in step 705. In the decision in step 707, StoreHandler checks whether the VFS of the location to which the file is to be uploaded is mapped to an HDFS. If the result is "No" (which indicates that the VFS to which the file is to be uploaded is not mapped to an HDFS), the flow continues to connector B for execution of the process for non-HDFS file systems. On the other hand, if the result from the decision in step 707 is "Yes" (which indicates that the VFS to which the file is to be uploaded is in fact mapped to an HDFS), StoreHandler uses the HDFS Java API to store the file to the HDFS. In step 709, StoreHandler reads the file data from the client. In step 711, StoreHandler uses the class FSDataInputStream to create the file in HDFS. In step 713, the file is created in HDFS in the specified location, and the process is over.

Figure 8:
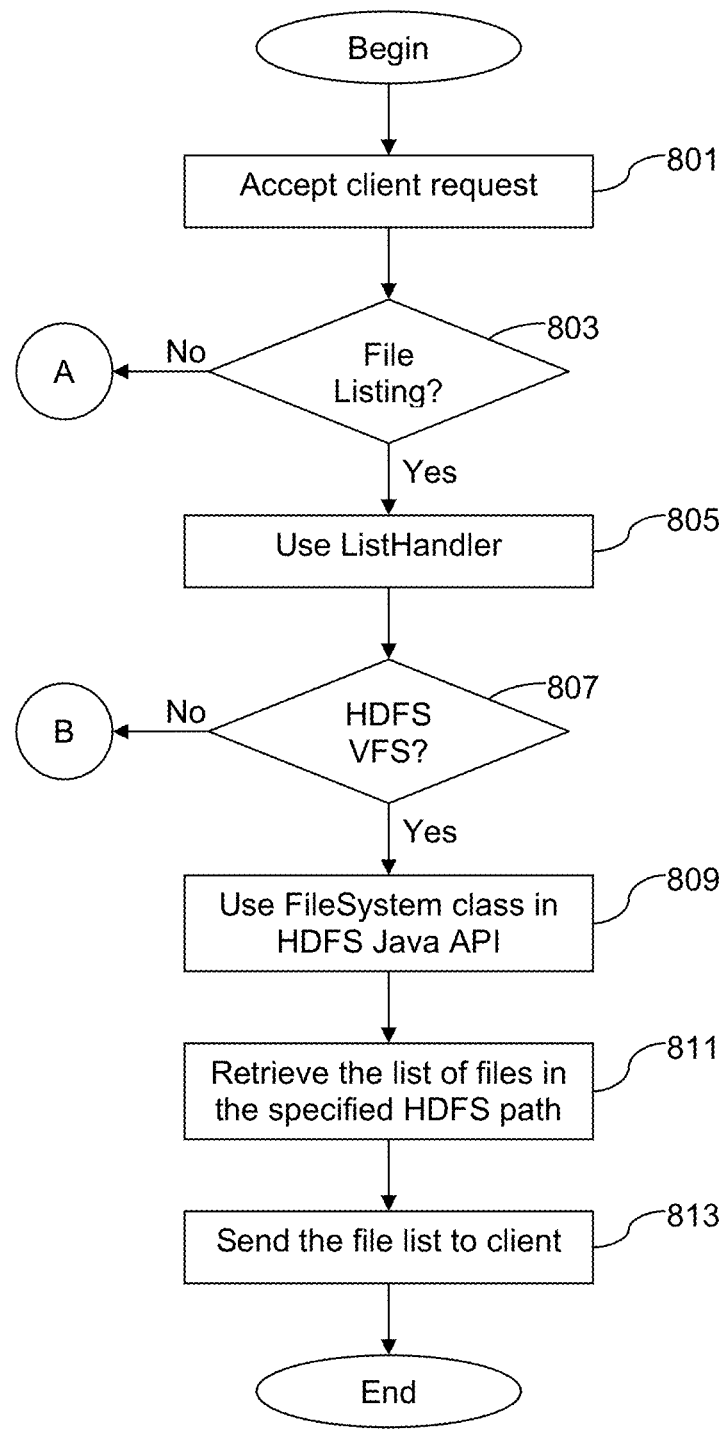
FIG. 8 is a flowchart showing an example process for displaying a list of files in an HDFS on an ActiveTransfer client, in accordance with certain example embodiments.

FIG. 8 is a flowchart showing an example process for displaying a list of files in an HDFS on an ActiveTransfer client, in accordance with certain example embodiments. The FIG. 8 example flowchart is similar to the FIG. 6 and FIG. 7 example flowcharts. For example, in step 801, the ActiveTransfer server accepts a client request. The decision in step 803 checks whether the request is for a file listing. If the result is "No" (which indicates that the client request is not a file listing request), the flow continues to Connector A to process the request for a different operation. If the result is "Yes" (which indicates that the client request is a file listing request), the ActiveTransfer server uses the class ListHandler to process the file listing request in step 805. In the decision in step 807, ListHandler checks whether the VFS of the location from which the listing is to be retrieved is mapped to an HDFS. If the result is "No", the flow continues to connector B for execution of the process for non-HDFS file systems. On the other hand, if the result from the decision in step 807 is "Yes", ListHandler uses the FileSystem class in the HDFS Java API as shown in step 809. In step 811, the list of files in the specified HDFS path is retrieved, and the file list is sent to the client in step 813. The process is then over.

Example Plug-in for Map Reduce Framework

The section illustrates how the plug-in of certain example embodiments may use customized classes of the Hadoop Map-Reduce Framework. More particularly, this section sets forth example descriptions for four example classes. The code for these example classes is provided in the attached Code Appendix, which is understood to form a part of this disclosure.

First, the class CustomJobConf extends org.apache.hadoop.mapred.JobConf. This class may be used for setting the information input and output paths for the map reduce framework of certain example embodiments. Based on the input path, for example, it may analyze the filename pattern and connect to FileMetadataCacheManager to obtain the required metadata for the file.

Second, the class FileMetadataCacheManager maintains a cache for file metadata using the filename pattern as a key. If there is a query for file metadata, then it will search in the cache. If not found, then it will connect to FileMetadataHandler to get the required data.

Third, the class CustomFileInputFormat extends SequenceFileInputFormat to customize file splits. The file splits are customized using transaction boundaries defined in file metadata.

Fourth, the class CustomMap extends MapReduceBase and implements Mapper to customize map implementation.

Figure 9:
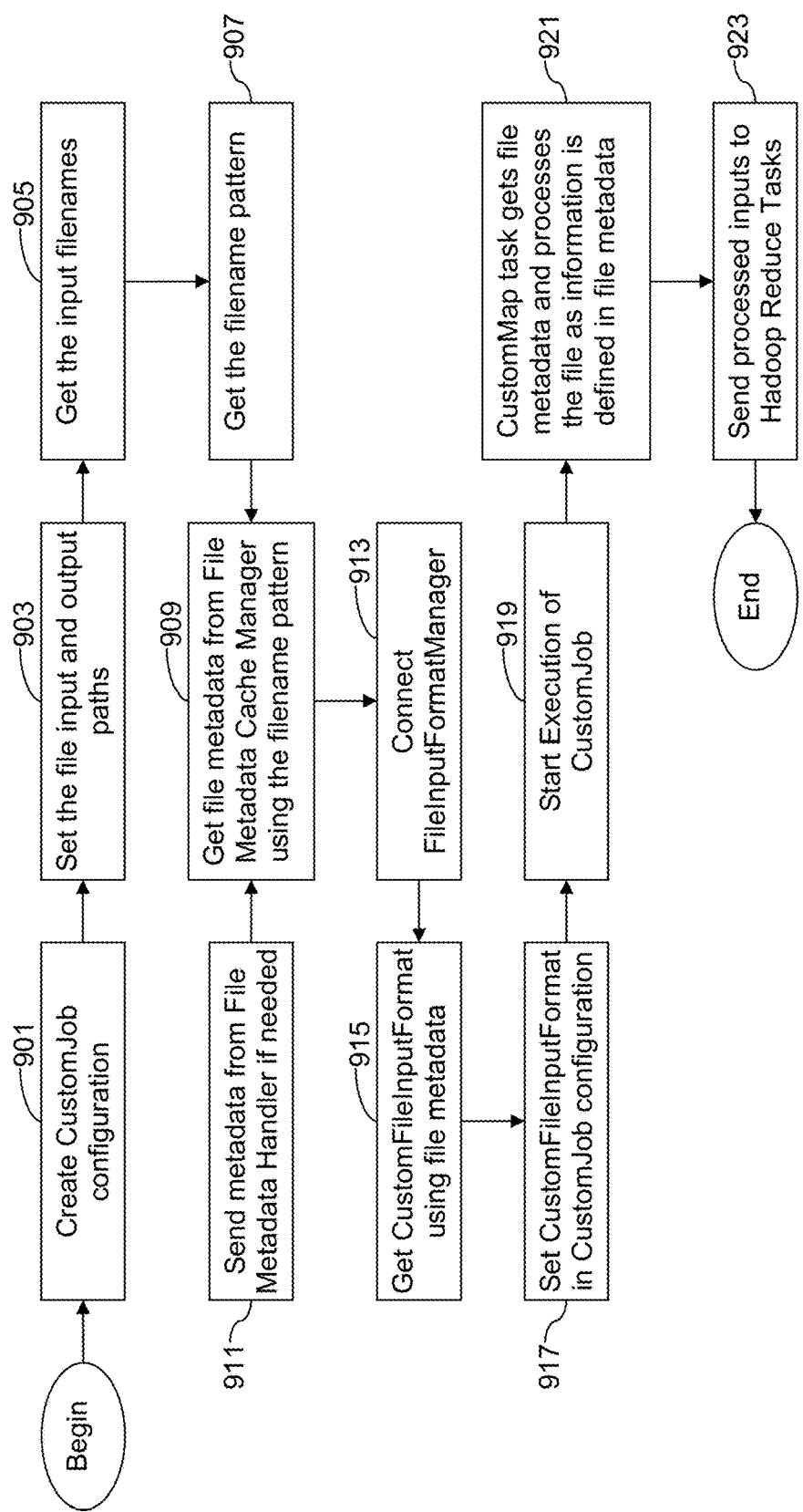
FIG. 9 is a flowchart showing an example process for creating a Hadoop Job and executing a Map-Reduce Task, in accordance with certain example embodiments.

FIG. 9 is a flowchart showing an example process for creating a Hadoop Job and executing a Map-Reduce Task, in accordance with certain example embodiments. The FIG. 9 flowchart uses the example classes briefly described above. In step 901, Hadoop Job will instantiate the CustomJobConf class (which, as indicated above, is an extension of org.apache.hadoop.mapred.JobConf class). This object holds the configuration for Hadoop Job. In step 903, the path filter, as well as the input and output paths for the CustomJobConf instance, will be set. In step 905, based on input paths and filter, the input file names will be obtained. In step 907, the filename pattern is determined.

In step 909, file metadata is retrieved from FileMetadataCacheManager using the filename pattern. FileMetadataCacheManager will check in the cache to determine whether such metadata is available. If it is not available from the cache, then it will connect to the File Metadata Handler on the Integration Server and will get the file metadata from the File Metadata Handler via the Integration Server in step 911.

In step 913, the Custom Job Configuration (e.g., represented by the CustomJobConf class) will connect to the File Input Format Manager, which maintains a cache of custom FileInput formats for filename patterns.

In step 915, FileInputFormatManager checks in the cache for the custom FileInput format. If it does not exist in the cache, then it creates one (e.g., as described in the pseudo-code for the CustomFileInputFormat class provided in the Code Appendix).

Step 917 sets the CustomFileInputFormat for the custom Job configuration (e.g., represented by the CustomJobConf class). If the end user explicitly sets the FileInputFormat to CustomJobConf (as it extends org.apache.hadoop.mapred.JobConf), then it will use the set the value of FileInputFormat; otherwise, CustomJobConf will get the CustomFileInputFormat based on FileMetadata.

In step 919, the Hadoop tool runner starts execution of the custom Job configuration. In step 921, the CustomMap task gets the file metadata, and the map implementation processes the data in the input file based on the instructions defined in the file metadata. Step 923 submits the processed output of the Hadoop CustomMap task to the Hadoop Reduce Tasks. The process is then ended.

Although certain example embodiments describe the File Metadata Handler as working with the ActiveTransfer tool, it will be appreciated that the File Metadata Handler of certain example embodiments may be made to work with any similar integrated managed file transfer solution in different example embodiments, e.g., to operate in the same or similar manner as that described in connection with steps 401-417 and/or to make possible the same or similar functionality. It also will be appreciated that the File Metadata Handler of certain example embodiments may be used for general file manipulations (e.g., copy, move, rename, delete, upload, download, and/or the like) with respect to complex file systems, of which HDFS is but one example. The description provided above also explains how the File Metadata Handler may be used during further processing in such complex file systems in connection with searching, etc., when the Map Reduce function is involved, thereby demonstrating a very flexible approach that may be used for a variety of tasks in a variety of different scenarios for a variety of different environments and/or environment combinations.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for enabling the accessing and/or processing of data stored in one or more computer systems in connection with a file metadata handler that has built-in support for a plurality of different file formats, the method comprising:
   receiving a request to create a file metadata definition for the file metadata handler, the file metadata definition being configurable for a first file format, and wherein files in the first file format have associated metadata for which processing logic is required to be defined in order to process such files;
   linking the received file metadata definition with an identifier that identifies files of the first file format, the first file format is a distributed file system file format used in an associated distributed file system;
   receiving format information that includes information about elements that are available to files having the first file format;
   updating the file metadata definition with at least one of received transaction boundary information including at least start and end elements for transaction boundaries, data validation information, data transformation requirements, including one or more conditions related to the elements, to be linked to the elements, or linkages between encrypted protocols and decryption tools for the first file format;
   storing the updated file metadata definition in a non-transitory computer readable storage medium, in enabling the file metadata handler to access and/or process data in the first file format; and
   deploying a plug-in to a map reduce framework associated with the distributed file system, the map reduce framework being used in accessing and/or manipulating files stored in the associated distributed file system.

2. The method of claim 1, wherein the identifier is a filename pattern and/or an extension in the filename.

3. The method of claim 2, wherein the identifier includes a suffix and/or prefix in the filename that uniquely defines the structure of the file.

4. The method of claim 1, further comprising automatically deriving the format information from an XML document type definition and/or schema.

5. The method of claim 1, wherein the format information is provided as a user-specified file envelope format.

6. The method of claim 1, wherein the start and end elements include, at least, start and end element identifiers.

7. The method of claim 6, further comprising automatically determining the transaction boundary information from an XML document type definition and/or schema.

8. The method of claim 1, wherein linkages between encrypted protocols and decryption tools include identified decryption keys and/or certificates.

9. The method of claim 1, wherein the plug-in includes a file metadata cache manager that stores metadata locally in the map reduce framework to facilitate processing map-reduce tasks involved in accessing and/or manipulating files stored in the associated distributed file system.

10. The method of claim 1, wherein the plug-in connects to, and retrieves metadata from, the file metadata handler in order to facilitate processing map-reduce tasks involved in accessing and/or manipulating files stored in the associated distributed file system, the file metadata handler being remote from the map reduce framework.

11. The method of claim 1, wherein a plurality of computer systems are provided, the plurality of computer systems including at least one file system and/or being accessible over at least one transport protocol for which the file metadata handler that has built-in support.

12. A non-transitory computer readable storage medium comprising instructions that, when executed by at least one processor of a computer system, cause the computer system to:
   receive a request to create a file metadata definition for the file metadata handler, the file metadata definition being configurable for a first file format, and wherein files in the first file format have associated metadata for which processing logic is required to be defined in order to process such files;
   link the received file metadata definition with an identifier that identifies files of the first file format, the first file format is a distributed file system file format used in an associated distributed file system;
   receive format information that includes information about elements that are available to files having the first file format;

update the file metadata definition with at least one of received transaction boundary information including at least start and end elements for transaction boundaries, data validation information, data transformation requirements, including one or more conditions related to the elements, to be linked to the elements, or linkages between encrypted protocols and decryption tools for the first file format;

store the updated file metadata definition in a non-transitory computer readable storage medium, in enabling the file metadata handler to access and/or process data in the first file format; and deploy a plug-in to a map reduce framework associated with the distributed file system, the map reduce framework being used in accessing and/or manipulating files stored in the associated distributed file system.

13. A method of processing files in connection with a server, the method comprising:

providing to a client computing device a listing of objects from a plurality of different computer systems that have different respective file systems and/or are accessible via different respective transport protocols, the listing organizing the objects in a common, integrated view of virtual folders;

receiving, from the client computing device, a request to process an object that is stored remote from the client computer device;

determining whether the server has built-in support for processing the object, based on the file system to be accessed, and the transport protocol to be used, in processing the request to process the object;

in response to a determination that the server has built-in support for processing the object, processing the request to process the object using the built-in support of the server; and in response to a determination that the server does not have built-in support for processing the object:

determining a file format for the object based on how the object is named, accessing from a data store a file metadata definition for the determined file format, the file metadata definition including format information about elements that are available in the determined file format and at least one of (a) transaction boundary information including at least start and end elements for transaction boundaries, (b) data validation information, (c) data transformation requirements, including one or more conditions related to the elements, to be linked to the elements, or (d) linkages between encrypted protocols and decryption tools, and processing the request to process the object using the accessed file metadata definition, wherein the server does not have built-in support for processing objects stored on one or more distributed file systems, and wherein the data store includes file metadata definitions for each said distributed file system, wherein the request to process the object relates to an object stored on a distributed file system for which the data store includes a file metadata definition, and wherein the method further comprises consulting a plug-in deployed to a map reduce framework associated with the distributed file system, the map reduce framework being used in processing files stored in the associated distributed file system.

14. The method of claim 13, wherein:

the plug-in includes a file metadata cache manager that stores metadata locally in the map reduce framework to facilitate processing map-reduce tasks involved in processing files stored in the associated distributed file system, and the plug-in connects to, and retrieves metadata from, the data store in order to facilitate processing map-reduce tasks involved in processing files stored in the associated distributed file system if the required metadata is not available from the file metadata cache manager, the data store being remote from the map reduce framework.

15. A non-transitory computer readable storage medium comprising instructions that, when executed by at least one processor of a computer system, cause the computer system to:

provide to a client computing device a listing of objects from a plurality of different computer systems that have different respective file systems and/or are accessible via different respective transport protocols, the listing organizing the objects in a common, integrated view of virtual folders;

receive, from the client computing device, a request to process an object that is stored remote from the client computer device;

determine whether the server has built-in support for processing the object, based on the file system to be accessed, and the transport protocol to be used, in processing the request to process the object;

in response to a determination that the server has built-in support for processing the object, process the request to process the object using the built-in support of the server; and in response to a determination that the server does not have built-in support for processing the object:

determine a file format for the object based on how the object is named, access from a data store a file metadata definition for the determined file format, the file metadata definition including format information about elements that are available in the determined file format and at least one of (a) transaction boundary information including at least start and end elements for transaction boundaries, (b) data validation information, (c) data transformation requirements, including one or more conditions related to the elements, to be linked to the elements, or (d) linkages between encrypted protocols and decryption tools, and process the request to process the object using the accessed file metadata definition, wherein the server does not have built-in support for processing objects stored on one or more distributed file systems, and wherein the data store includes file metadata definitions for each said distributed file system, wherein the request to process the object relates to an object stored on a distributed file system for which the data store includes a file metadata definition, and wherein the computer system being further caused to consult a plug-in deployed to a map reduce framework associated with the distributed file system, the map reduce framework being used in processing files stored in the associated distributed file system.

16. The method of claim 1, wherein the transaction boundary information including information for processing in a sequential order to ensure data integrity.

* * * * *